Feb. 18, 1936. A. L. BRIDGHAM Re. 19,855

BELL RINGER

Original Filed Oct. 30, 1931

INVENTOR=
Arthur L. Bridgham
By John E. R. Sharp
ATTORNEY=

Reissued Feb. 18, 1936 Re. 19,855

UNITED STATES PATENT OFFICE 19,855

BELL RINGER

Arthur L. Bridgham, Boston, Mass.

Original No. 1,929,197, dated October 3, 1933, Serial No. 572,011, October 30, 1931. Application for reissue September 26, 1935, Serial No. 42,311

9 Claims. (Cl. 121—2)

Figure 2:
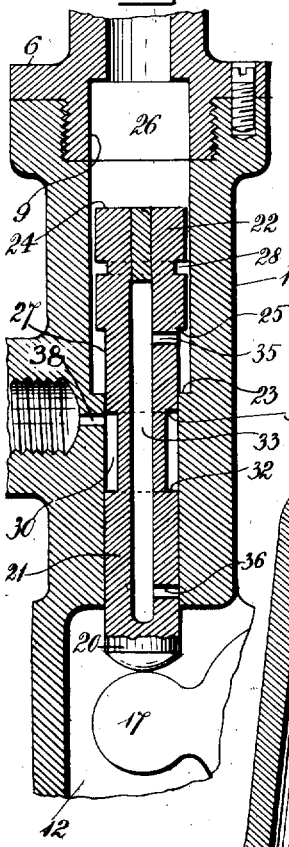

The invention relates to an improvement in bell ringers of a type essentially adapted to be used on a locomotive.

The essential object of the invention is to provide a reliable and economical bell ringer by which the bell may be rung with a steady and moderate stroke.

The invention can best be seen and understood by reference to the drawing in which—

Figure 1:
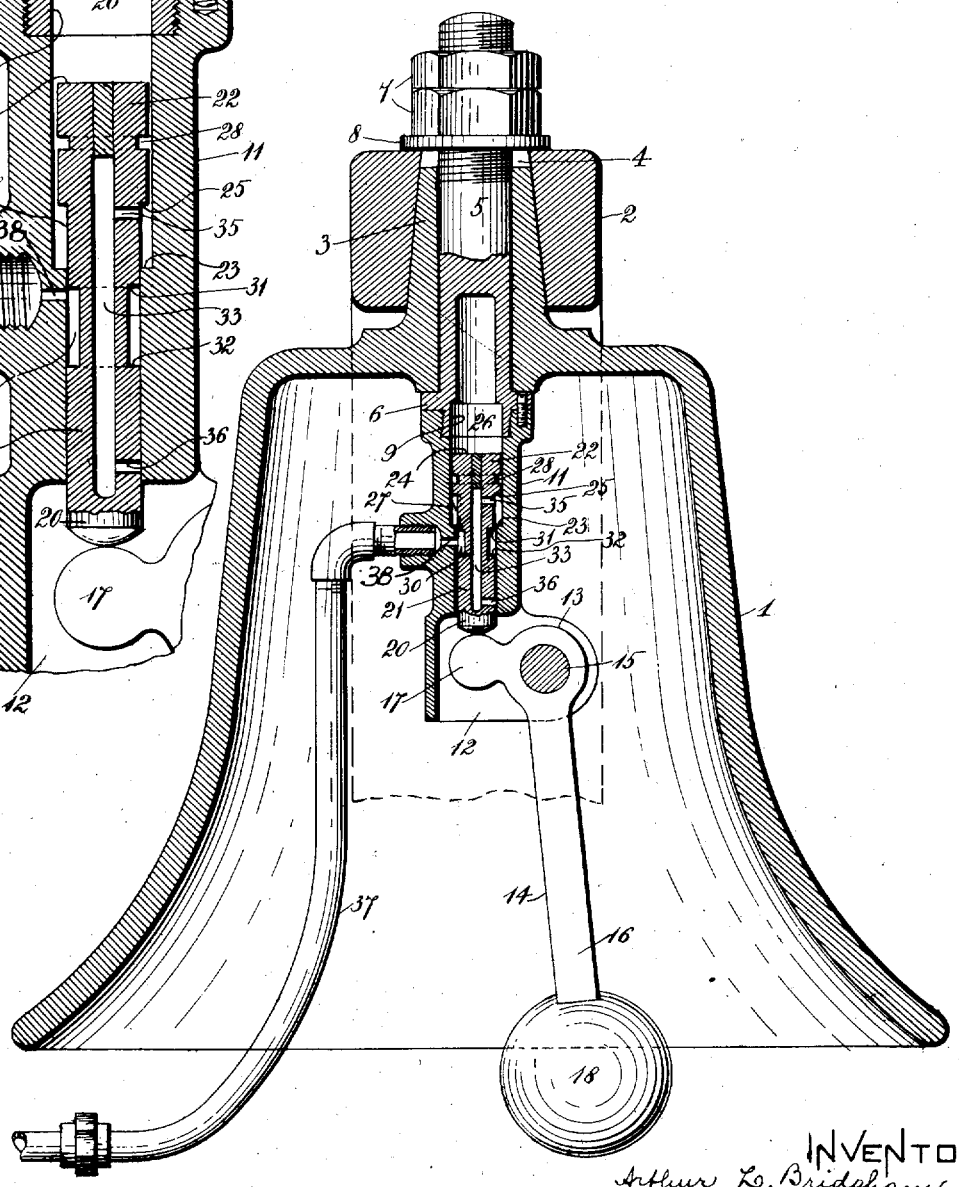

Figure 1 is a cross section of a bell equipped with the bell ringing mechanism embodying the invention, and Fig. 2 is a cross section in enlarged detail of the plunger section of the mechanism shown in Fig. 1.

Referring to the drawing:

1 represents the bell fixed to a yoke 2 from the head of which the bell hangs suspended. The bell is provided with a frustroconical top extension 3 which fits within a socket 4 in the head of the yoke. The top extension 3 is drawn to fit tight within its socket and the bell fastened to the yoke, by means of a bolt 5 extending through the top of the bell, thence upward through its top extension 3 with projection above the extension and above the yoke. At its lower end the bolt is provided with a flange forming head 6 which bears against the interior top wall of the bell. Arranged upon the upper threaded end of the bolt, projecting above the top extension 3 and yoke as aforesaid, is a nut 7 which bears against the top surface of the yoke, a washer 8 being interposed between the nut and the yoke. With the parts thus arranged on tightening the nut the top extension on the bell will be drawn to fit tight within its socket and the bell fixedly secured to the yoke.

At its lower end inside the chamber of the bell the bolt 5 is provided with a threaded extension 9 and on this extension with top edge bearing against the flanged head 6 of the bolt is a cylinder 11 which extends downward well into the chamber of the bell. The lower end 12 of this cylinder is made cleft, and projecting laterally from the respective clefts are ears 13 to which is pivoted a lever 14 by a pin 15. The lever comprises arms 16 and 17, respectively. Of these the arm 16 forms the tongue of the bell and bears on its end a ball striker 18 which gives weight to the arm. The arm 17 of the lever is the one to which force is applied for turning the lever and thereby sounding the bell. This arm occupies an angular relation to the arm 16 and extends laterally into the cleft bottom end of the cylinder where it can be engaged by a plunger or piston 20 working within the cylinder. The arm 17 is maintained in position to be engaged by the plunger by the weighted arm 16. The arm 16 will normally hang pendant inside the chamber of the bell from the point of its pivotal support and from its pendant position is turned to strike the bell. The relative positions of the parts are such that whether the weighted arm 16 is occupying a normal pendant position or a striking position, it will in either case maintain the arm 17 within the cleft bottom end of the cylinder in position to be engaged by the plunger.

21 represents the body of the plunger and 22 its head. The head is slightly larger diametrically than the body and the cylinder is correspondingly bored in order that both the head and body of the plunger may have a sliding fit within the cylinder. This fit, however, is not so snug as to prevent entering air under pressure from passing through the joint between the plunger and the internal wall of the cylinder, as will later be explained.

The tongue is operated to strike the bell as the plunger is moved downward in the cylinder, it being the lower end of the plunger extending outside the cylinder which engages the arm 17 of the lever of which the tongue forms a part.

The shoulder or edge 23 on the cylinder at the junction between its respective bores will form a stop for the head of the plunger as the plunger is moved downward, but the arrangement of the parts is such that the head will never engage this stop so as to prevent the effective downward movement of the plunger for operating the tongue and striking the bell. 24 represents the top surface of the plunger head and 25 its under surface. The top surface 24 is much larger in area than the under surface 25. Above the head of the plunger there is provided within the cylinder a pressure chamber 26 and this chamber is extended upward even into the body of the screw 5 to which the cylinder is attached, thus making a chamber of relatively large capacity. When the plunger is raised so that its head is spaced above the edge 23 on the cylinder a pressure chamber 27 will be formed below the head of the plunger, the bottom surface 25 of the head forming the upper edge wall of this chamber and the edge 23 on the cylinder forming the bottom edge wall of the chamber. The head of the plunger is preferably provided with an annular incision 28 opening into the joint between the head and the cylinder in order to facilitate the passage of pressure through this joint. The body of the plunger is incised to form an annular air pocket 30 between the body of the plunger and the cylinder 31 forming the top edge wall of this pocket and 32 its bottom edge wall. Extended within the body of the plunger is an exhaust passage 33. Inlet is had to this passage from the pressure chamber 27 by way of an inlet exhaust port 35 arranged just below the head of the plunger. Outlet is had from the passage 33 to the exterior surface of the body of the plunger by way of an outlet exhaust port 36 inwardly removed from the bottom end of the plunger so that the port 36 will normally be closed by the cylinder and will be open to the atmosphere only when the plunger has been moved down a determinate distance within the cylinder, or, in other words, so far that the port 36 will lie beyond the bottom edge of the cylinder. Air under pressure is admitted to the plunger for operating it by way of an inlet pipe 37 and thence by a port 38 through the side of the cylinder. The arrangement of this port with relation to the annular pocket 30 formed in the body of the plunger is such that air will be directed through the port into the pocket when the plunger is occupying its normal position and which position corresponds with the normal gravitated position of the tongue. The arrangement is, also, such that when the plunger is in its normal position as aforesaid the top edge or shoulder 31 of the pocket 30 will lie near the bottom edge 23 of the chamber 27 leaving but little joint between these edges so that pressure admitted to the pocket 30 has but little joint to pass through before admittance to the chamber 27.

The body of the plunger is made to have a rather snug sliding fit within the cylinder. The head of the plunger does not have an especially snug fit within the cylinder, or, in other words, not so close a fit as that of the body of the plunger within the cylinder. The fit of the plunger within the cylinder should be such as to leave a joint which permits of the pressure readily passing from the chamber 27 to the chamber 26. At the same time the joint should not be so large as to permit of a too free escape of high pressure from the chamber 26 when the exhaust is open, the chamber 26 exhausting through this joint.

The operation is as follows: Assuming the tongue to be in its normal gravitated position the pressure entering by way of the pipe 37 and inlet port 38 in the side of the cylinder will pass into the annular air pocket 30, thence at all points around the body of the plunger upwardly through the joint into the chamber 27, thence upwardly through the joint between the head of the plunger and the wall of the cylinder into the pressure chamber 26. While the head of the plunger presents a very much larger surface area than the surface area presented by the bottom edge 25 of the head which forms the top wall of the chamber 27, yet for a very slight interval of time the pressure in the chamber 27 against the edge 25, especially when atmospheric air is initially in the chamber 26, will exceed the pressure in the chamber 26 and accordingly will operate to lift the plunger. Soon, however, the pressure in the chamber 26 will be such as to maintain the plunger in a state of equilibrium and then as the pressure increases in the chamber 26 it will move the plunger downwardly and as the plunger is moved downwardly it will engage the arm on the striker and thus operate to move the striker towards the bell.

As the plunger is moved downwardly pressure will continue to pass rather freely from the pocket 30 into the chamber 27 until the pocket 30 is moved to lie below the inlet 38, the body of the plunger then closing over this inlet. Pressure will still pass into the chamber 27 through the joint and thence into the chamber 26 though in greatly diminished amount. Just after the body of the plunger has closed over the inlet 38 the plunger will have reached a position where the exhaust outlet 36 will clear the bottom end of the cylinder and be open to the atmosphere, and the striker will have become moved to a position quite near the bell. Thereupon the pressure in the chamber 27 below the head of the plunger will become suddenly released, and the high pressure within the pressure chamber 26, inasmuch as it can only slowly escape to the then open exhaust outlet through the joint between the head of the plunger and the cylinder, will impart to the plunger a relatively quick downward impulse. This impulse taking place when the striker has been moved by the plunger into a position quite near the bell, causes the striker to engage the bell with a quick blow. After striking the bell the striker will immediately begin to recede, the pressure in the chamber 26 then having become so diminished as to exert no such active force upon the plunger as will prevent its recession. Pressure, however, will not have become entirely exhausted from the chamber 26 owing to the relatively large size of the chamber, the slowness of its exhaust, and the fact that some pressure is entering the chamber at this time.

The pressure remaining in the chamber 26, though still continuing to slowly exhaust, will permit of only a slow recession of the striker towards its normal gravitated position. In other words, the air in the pressure chamber 26 will act as a buffer to permit only of a slow lifting of the plunger and, accordingly, a slow recession of the striker, and this is emphasized by the fact that as the plunger rises it tends to further compress the air within the chamber 26. The striker will move back slowly to a position about midway between its normal gravitated position and the bell. At about this time the plunger will have been lifted sufficiently to close the outlet port 36 to the atmosphere, preventing further exhaust of the pressure. Some pressure from the inlet port 38 will be entering the chamber of the cylinder and passing to the chamber 26 although the inlet port 38 will not then be opened, or in register with the pocket 30, until the exhaust port 36 has become well closed.

After the exhaust port 36 has become well closed, the striker still continuing to recede and the plunger to be lifted, the air pocket 30 will be brought into register with the inlet port 38. Thereupon an increased flow of the entering pressure will be had to the chamber 27 which will assist in lifting the plunger and permit of a more free return of the striker. When the plunger has been lifted so far as to permit of the return of the striker to its normal gravitated position the plunger will have assumed the relative position in the cylinder first referred to and pressure will freely pass into the chamber 27 and thence into the chamber 26. This more free entry of pressure into the chamber 27 will not act to lift the plunger as before, when atmospheric air only was in the chamber 26, owing to the fact that the pressure in the chamber 26 will then be much higher than atmospheric pressure and accordingly the plunger will not be lifted off the end of the arm of the striker, the end of the plunger and the arm for operating the striker keeping together at all times and preventing any clicking action. The pressure in the chamber 26 will soon be sufficient to again depress the plunger and the operation is continued as before.

But little air is used in the operation of the bell ringer. In practice air under pressure of from 90 to 130 pounds is employed. Very little air will be lost even when the exhaust is open which is only for short intervals of time. The bell ringer operates with a very moderate stroke of from 50 to 60 strokes a minute. The slowness of the stroke depends not upon the slowness with which the air is admitted to the compression chamber 26 above the head of the chamber but really upon the slowness with which the air exhausts from this chamber after the outlet passage is opened to the atmosphere. In other words, the greater part of the control of speed is from the time that the tongue has left the bell back to the time that the inlet port 38 has become opened and the inlet port does not become opened until the outlet port 36 to the atmosphere has become well closed and the striker well back to its normal gravitated position. The exhaustion of air from the chamber above the piston is controlled by the size of the joint between the head of the plunger and the wall of the cylinder inasmuch as the air from the compression chamber 26 must, in order to exhaust, pass through this joint, the entry to the exhaust or port 35 lying below this joint and head of the plunger. In practice, to obtain a moderate stroke of from 50 to 60 strokes a minute the head of the plunger is made about 1/1000 of an inch smaller in diameter than the diameter of the cylinder within which it is contained, assuming the device to have about the proportion of the parts shown in Fig. 2 of the drawing but with the plunger body about ½'' in diameter and the head of the plunger about ¾'' in diameter with the remaining parts in like relative proportion. The chamber 26 above the head of the plunger should be a relatively large chamber in about the proportion to the other parts as shown in Fig. 2. The chamber is necessarily large for if a too small chamber is employed the entering air will fill in too quickly and prevent proper lifting of the plunger to permit of a full return of the striker to its normal gravitated position. The chamber should, also, be such as to hold a sufficient volume of compressed air, not only to impart a quick downward stroke to the plunger for moving the striker into quick striking engagement with the bell, but such in amount as will not exhaust too quickly from the chamber when the exhaust is opened in order to obtain proper timing of the stroke.

Having thus fully described my invention, I claim and desire to secure by Letters Patent of the United States:—

1. In a striker mechanism for a bell having a striker movable into and out of engagement with the bell, the combination therewith of mechanism for moving the striker including a body providing a cylinder having an enlarged portion, said body having an inlet passage communicating with the cylinder for supplying fluid under pressure, a plunger having a body portion movable in said cylinder and an enlarged head movable in the enlarged portion of the cylinder, said plunger and cylinder having cooperating surfaces adapted to permit an increased inflow of fluid under pressure as said plunger rises above a predetermined position, said plunger and body having means adapted to cooperate when said plunger has moved to a predetermined position to exhaust fluid under pressure from said enlarged portion of the cylinder.

2. In a striker mechanism for a bell having a striker movable into and out of engagement with the bell, the combination therewith of mechanism for moving the striker including a body providing a cylinder having an enlarged portion, said body having an inlet passage communicating with the cylinder for supplying fluid under pressure, a plunger having a body portion movable in said cylinder and an enlarged head movable in the enlarged portion of the cylinder, said plunger having an annular groove which as said plunger is moved is brought into and out of registry with said inlet passage, said plunger and body having means adapted to cooperate when said plunger has moved to a predetermined position to exhaust fluid under pressure from said enlarged portion of the cylinder.

3. In a striker mechanism for a bell having a striker movable into and out of engagement with the bell, the combination therewith of mechanism for moving the striker including a body providing a cylinder having an enlarged portion, said body having an inlet passage communicating with the cylinder for supplying fluid under pressure, a plunger having a body portion movable in said cylinder and an enlarged head movable in the enlarged portion of the cylinder, said plunger having an annular groove which as said plunger is moved is brought into and out of registry with said inlet passage, said plunger and body having means adapted to cooperate when said plunger has moved to a predetermined position to exhaust fluid under pressure from said enlarged portion of the cylinder, said means including a passage in the body of said plunger adapted to communicate at one end with the enlarged portion of said cylinder and adapted to communicate at its other end with the atmosphere when said plunger has moved to said predetermined position.

4. In a bell ringer the combination comprising a body providing a cylinder having a contracted portion and an enlarged portion, said body having an inlet passage connecting with the chamber of the cylinder below the enlarged portion thereof for supplying fluid under pressure, a plunger having a contracted portion movable in the contracted portion of the cylinder and an enlarged head movable in the enlarged portion of the cylinder, the contracted portions of the cylinder and plunger having co-operating surfaces adapted to permit an inflow of pressure from said inlet to the enlarged portion of the cylinder beneath the head of the plunger, the head of the plunger and adjacent wall of the cylinder within which it is contained co-ordinated to permit passage of pressure from beneath the head of the plunger to above the head of the plunger and to permit of a protracted escape of fluid pressure from above the head of the plunger when the fluid pressure below said head is exhausted, said body and plunger having means permitting of the exhaustion of fluid pressure from the enlarged portion of said cylinder below said head of the plunger when said plunger is moved down to a predetermined position.

5. In a bell ringer the combination comprising a body providing a cylinder having a contracted body portion and an enlarged portion, a plunger having a contracted portion movable in the contracted portion of the cylinder, and an enlarged head movable in the enlarged portion of the cylinder, said body having an inlet passage opening into the joint between the contracted portion of the plunger and adjacent cylinder wall within which it is contained, said contracted portion of the plunger having a sliding fit within the contracted portion of the cylinder to form a joint permitting of the passage of fluid pressure there-through to beneath the head of the plunger from said inlet passage, said contracted portion of the plunger and adjacent wall of the cylinder within which it is contained co-operating also to permit of an increased inflow of pressure to beneath the head of the plunger when the plunger has risen to a predetermined position, the head of the plunger being spaced from the adjacent wall of the cylinder within which it is contained in an amount larger than the joint between the contracted portion of the plunger and its adjacent cylinder wall, said body and plunger having means permitting of the exhaustion of fluid pressure from the enlarged portion of said cylinder below said head of the plunger when said plunger is moved down to a predetermined position.

6. In a bell ringer the combination comprising a body providing a cylinder having a contracted portion and an enlarged portion, a plunger having a contracted portion movable in the contracted portion of the cylinder and an enlarged head movable in the enlarged portion of the cylinder, said body having a pressure chamber above the head of the plunger, said body having also an inlet passage connecting with the chamber of the cylinder below the enlarged portion thereof for supplying fluid under pressure, the contracted portions of the cylinder and plunger having co-operating surfaces adapted to permit an inflow of pressure from said inlet to beneath the head of the plunger and with increased inflow of fluid pressure when the plunger has risen above a predetermined position, the head of the plunger and adjacent wall of the cylinder within which it is contained co-ordinating to permit the passage of fluid pressure from beneath the head of the plunger to said chamber above the head of the plunger and to permit of a protracted escape of fluid pressure from said chamber above the head of the plunger when the fluid pressure below said head is exhausted, said body and plunger having means permitting of the exhaustion of fluid pressure from the enlarged portion of said cylinder below said head of the plunger when said plunger is moved down to a predetermined position, said means including a port to the atmosphere arranged whereby the port will become closed before increase is made to the admittance of fluid pressure to beneath the head of the plunger on the rising of the plunger to a predetermined position as aforesaid.

7. In a bell ringer the combination comprising a body providing a cylinder having a contracted portion and an enlarged portion, a plunger having a contracted portion movable in the contracted portion of the cylinder and an enlarged head movable in the enlarged portion of the cylinder, said body having a pressure chamber above the head of the plunger, said body having also an inlet passage connecting with the chamber of the cylinder below the enlarged portion thereof for supplying fluid under pressure, said plunger having an annular groove in the contracted portion thereof which as said plunger is moved is brought into and out of register with said inlet passage, the head of the plunger and adjacent wall within which it is contained co-ordinating to permit of the passage of fluid pressure from beneath the head of the plunger to said chamber above the head of the plunger and to permit of a protracted escape of fluid pressure from said chamber above the head of the plunger when the fluid pressure below said head is exhausted, said body and plunger having means permitting of the exhaustion of fluid pressure from the enlarged portion of said cylinder below said head of the plunger when said plunger is moved down to a predetermined position.

8. In a bell ringer the combination comprising a body providing a cylinder having a contracted portion and an enlarged portion, a plunger having a contracted portion movable in the contracted portion of the cylinder and an enlarged head movable in the enlarged portion of the cylinder, said body having a pressure chamber above the head of the plunger, said body having also an inlet passage connecting with the chamber of the cylinder below the enlarged portion thereof for supplying fluid under pressure, said plunger having an annular groove in the contracted portion thereof which as said plunger is moved is brought into and out of register with said inlet passage, the head of the plunger and adjacent wall within which it is contained co-ordinating to permit of the passage of fluid pressure from beneath the head of the plunger to said chamber above the head of the plunger and to permit of a protracted escape of fluid pressure from said chamber above the head of the plunger when the fluid pressure below said head is exhausted, said body and plunger having means including a port to the atmosphere permitting of the exhaustion of fluid pressure from the enlarged portion of said cylinder below said head of the plunger when said plunger has been moved down to a predetermined position, said port to the atmosphere and said annular groove in the plunger being relatively arranged whereby the port to the atmosphere will become closed on the plunger rising before said annular groove is in communication with said inlet passage.

9. In a bell ringer the combination comprising a body providing a cylinder having a contracted portion and an enlarged portion, a plunger having a contracted portion movable in the contracted portion of the cylinder and an enlarged head movable in the enlarged portion of the cylinder, said body having a pressure chamber above the head of the plunger, said body having also an inlet passage connecting with the chamber of the cylinder below the enlarged portion thereof for supplying fluid under pressure, said plunger having an annular groove in the contracted portion thereof which as said plunger is moved is brought into and out of register with said inlet passage, the head of the plunger and adjacent wall within which it is contained co-ordinating to permit of the passage of fluid pressure from beneath the head of the plunger to said chamber above the head of the plunger and to permit of a protracted escape of fluid pressure from said chamber above the head of the plunger when the fluid pressure below said head is exhausted, said plunger and body having means adapted to co-operate to permit of the exhaustion of fluid pressure from said enlarged portion of the cylinder below the head of the plunger when said plunger is moved down to a predetermined position, said means including a passage in the contracted portion of the plunger communicating at one end with the enlarged portion of the cylinder beneath the head of the plunger and at its other end with the atmosphere at a point removed from the end of the plunger.

ARTHUR L. BRIDGHAM.